US012364881B1

(12) United States Patent
Chen et al.

(10) Patent No.: US 12,364,881 B1
(45) Date of Patent: Jul. 22, 2025

(54) METHOD AND SYSTEM FOR CONTROLLING PRESSURE IN MASK, AND RESPIRATOR

(71) Applicant: CHANGZHOU SHINE SCIENCE & TECHNOLOGY CO.LTD., Changzhou (CN)

(72) Inventors: Liang Chen, Changzhou (CN); Dong Liang, Changzhou (CN); Hongjun Zhao, Changzhou (CN)

(73) Assignee: CHANGZHOU SHINE SCIENCE & TECHNOLOGY CO. LTD., Changzhou (CN)

( * ) Notice: Subject to any disclaimer, the term of this patent is extended or adjusted under 35 U.S.C. 154(b) by 0 days.

(21) Appl. No.: 19/028,989

(22) Filed: Jan. 17, 2025

Related U.S. Application Data

(63) Continuation of application No. PCT/CN2024/108764, filed on Jul. 31, 2024.

(30) Foreign Application Priority Data

Jan. 4, 2024 (CN) ......................... 202410008744.1

(51) Int. Cl.
*A62B 7/02* (2006.01)
*A62B 9/00* (2006.01)
(Continued)

(52) U.S. Cl.
CPC .................. *A62B 7/02* (2013.01); *A62B 9/00* (2013.01); *A62B 18/006* (2013.01); *A62B 18/02* (2013.01)

(58) Field of Classification Search
CPC ........... A62B 7/02; A62B 9/00; A62B 18/006; A62B 18/02; A61M 16/024
See application file for complete search history.

(56) References Cited

U.S. PATENT DOCUMENTS

2006/0065270 A1* 3/2006 Li ........................ A61M 16/026 128/204.23
2021/0330853 A1* 10/2021 Mizandari ................ A62B 7/10
2022/0020488 A1* 1/2022 Kennedy ............... G06F 16/903

FOREIGN PATENT DOCUMENTS

CN 110529419 A * 12/2019
CN 113941104 A * 1/2022 ........... A61B 5/0816
(Continued)

*Primary Examiner* — Kathryn E Ditmer
(74) *Attorney, Agent, or Firm* — George D. Morgan

(57) ABSTRACT

The invention relates to respirator technology, in particular to a method and system for controlling the pressure in a mask, and a respirator. The method comprises: arranging a fan on a mask, wherein the fan, after being started, continuously supplies air into the mask; determining a correlation between a fan speed, a pressure in the mask and respiratory behaviors of a user; and controlling, in an operating process of the fan, the fan speed according to the pressure acquired in real time and the correlation. The fan, after being started, continuously supplies air into the mask, the fan speed is dynamically controlled according to the acquired pressure and the determined correlation, and the system can control the air supply according to real-time requirements of users to minimum the respiratory resistance. The method offers a personalized, real-time ventilation solution that adjusts to users' respiratory needs, effectively reducing respiratory resistance.

2 Claims, 7 Drawing Sheets

(51) Int. Cl.
*A62B 18/00* (2006.01)
*A62B 18/02* (2006.01)

(56) References Cited

FOREIGN PATENT DOCUMENTS

| | | | | | |
|---|---|---|---|---|---|
| CN | 115919287 | A | | 4/2023 | |
| CN | 116736704 | A | * | 9/2023 | |
| CN | 116747393 | A | * | 9/2023 | |
| CN | 117055638 | A | * | 11/2023 | |
| CN | 117111446 | A | | 11/2023 | |
| EP | 3677313 | A1 | * | 7/2020 | ........... A61B 5/0816 |
| EP | 3791936 | A1 | | 3/2021 | |
| EP | 3915645 | A1 | * | 12/2021 | ........... A62B 18/006 |
| KR | 20210145043 | A | * | 12/2021 | |
| WO | WO-2021056065 | A1 | * | 4/2021 | .......... A61M 16/024 |

* cited by examiner

METHOD AND SYSTEM FOR CONTROLLING PRESSURE IN MASK, AND RESPIRATOR

TECHNICAL FIELD

The invention belongs to the technical field of respirators, in particular to a method and system for controlling the pressure in a mask, and a respirator.

BACKGROUND

Respirators, as protective equipment, adopt a filter cartridge to filter air inhaled by users to prevent harmful substances from entering the respiratory tract. The filter cartridges, as the key component of the respirators, are made from different materials, adopt different techniques and are used for filtering out particulate matter, gas or vapor in air. Different filter cartridges can selectively filter out different pollutants according to different designs and service environments of equipment. Respirators are widely used for, for example, mining, stone and wood processing, agricultural production, loading, unloading and transportation in freight yards at the quay, and other scenarios, and are also used by various processing enterprises, chemical manufacturers, laboratories, etc.

Different types of filter cartridges generally adopt different filter materials which are different in breathability. Some efficient filter materials may produce a greater resistance against the air flow, and users, when breathing, need to overcome such a resistance. In addition, the design of the filter cartridges also has an influence on the respiratory resistance, and some more compact and denser filter cartridges may lead to a larger respiratory resistance.

In use of the respirators, particulate matter or gas will gradually accumulate on the filter cartridge with time, leading to a gradual increase in the respiratory resistance; and when the filter cartridge is saturated to some extent with the accumulation of the particulate matter or gas, it needs to be replaced with a new one, otherwise users will suffer from a greater respiratory resistance.

How to solve the problems caused by the respiratory resistance of existing respirator masks becomes a technical problem to be solved.

SUMMARY

The objective of the invention is to provide a method and system for controlling the pressure in a mask, and a respirator to effectively solve the problems mentioned above.

To fulfill the above objective, the technical solutions adopted by the invention are as follows:

A method for controlling the pressure in a mask comprises:

- a step of arranging a fan on a mask, wherein the fan, after being started, continuously supplies air into the mask;
- a step of determining a correlation between a fan speed, a pressure in the mask and respiratory behaviors of a user; and
- a step of controlling, in an operating process of the fan, the fan speed according to the pressure acquired in real time and the correlation.

Further, the step of determining a correlation between a fan speed, a pressure in the mask and respiratory behaviors of a user comprises:

- acquiring the air pressure in the mask in real time;
- defining a rising process of the air pressure as an air intake process that comprises exhaling air by the user and supplying air into the mask by the fan, and defining a falling process of the air pressure as an air exhaust process that comprises inhaling air by the user and supplying air into the mask by the fan, wherein whether the air pressure rises or falls is determined by comparing the air pressure with a set reference air pressure; and
- setting the correlation as decreasing the fan speed in the air intake process and increasing the fan speed in the air exhaust process.

Further, the reference air pressure is input to a PID controller, and with the reference air pressure as a set point, the PID controller controls the fan speed according to a deviation of a currently acquired air pressure from the set point to reduce the deviation.

Further, a control model of the PID controller is:

$$u(t) = K_p \cdot e(t) + K_i \cdot \int_0^t e(t)dt + K_d \cdot \frac{de(t)}{dt} + K_f \cdot f(t)$$

where,

- u(t) is a fan speed output by the PID controller;
- e(t) is an error between the set point and the currently acquired air pressure;
- $K_p$ is a gain parameter of a proportional term;
- $K_i$ is a gain parameter of an integral term;
- $K_d$ is a gain parameter of a derivative term;

$$\int_0^t e(t)dt$$

is an integral of e(t) with time;

$$\frac{de(t)}{dt}$$

is a derivative of e(t) with time;

- $K_f$ is a dynamic gain parameter of the user;
- $f(t)$ is a fan speed correction function, to which motion data of the user and air pressure data in the mask are input, and from which a corrected fan speed is output.

Further, a method for determining the fan speed correction function $f(t)$ comprises:

- a step of arranging a motion sensor on the mask, and acquiring and collecting the motion data of the user;
- a step of collecting, by a fan controller, speed data of the fan;
- a step of collecting the air pressure data in the mask; and
- a step of performing feature extraction based on the motion data, the speed data and the air pressure data, and establishing the fan speed correction function $f(t)$ based on extracted features by means of a machine learning algorithm.

Further, the step of performing feature extraction based on the motion data, the speed data and the air pressure data, and establishing the fan speed correction function $f(t)$ based on extracted features by means of a machine learning algorithm comprises:

- extracting features related to the fan speed from the motion data and the air pressure data, and extracting features related to motions and air pressure changes from the speed data;

combining the features extracted from different data sources, and defining the fan speed to be predicted as a target variable;

dividing in proportion a data set into a train set and a test set, which are used for training a decision tree model; and using the trained decision tree model as the fan speed correction function $f(t)$.

Further, the step of determining a correlation between a fan speed, a pressure in the mask and respiratory behaviors of a user comprises:

collecting experimental data related to the fan speed, the pressure in the mask and the respiratory behaviors of the user;

extracting features from the collected data to obtain a data set, wherein the features are used for reflecting a relationship between the fan speed, the pressure in the mask and the respiratory behaviors of the user;

establishing a neural network model that depicts the relationship between the fan speed, the pressure in the mask and the respiratory behaviors of the user;

dividing in proportion the data set into a train set and a test set, which are used for training the neural network model; and using the trained neural network model as a correlation model of the fan speed, the pressure in the mask and the respiratory behaviors of the user.

Further, the neural network model comprises:

an input layer, corresponding to features of the fan speed, the pressure in the mask and the respiratory behaviors of the user by means of three nodes respectively;

hidden layers, at least comprising an LSTM layer used for capturing temporal information in sequential data;

an output layer, used for outputting a predicted fan speed; and activation functions, added behind each hidden layer and the output layer to introduce nonlinearity;

wherein, when the trained neural network model is used, the currently acquired pressure in the mask is input to the neural network model, and the neural network model outputs the predicted fan speed, which is used for controlling the fan speed.

A system for controlling the pressure in a mask uses the method for controlling the pressure in a mask and comprises:

a fan, arranged on a mask and after being started, used for continuously supplying air into the mask;

a correlation analysis module, used for determining a correlation between a fan speed, a pressure in the mask and respiratory behaviors of a user; and a control module, used for controlling, in an operating process of the fan, the fan speed according to the pressure acquired in real time and the correlation.

A respirator comprises a mask and the system for controlling the pressure in a mask, wherein a pressure in the mask is controlled by the system for controlling the pressure in a mask.

The technical solutions of the invention fulfill the following beneficial effects:

In the invention, the fan, after being started, continuously supplies air into the mask, the fan speed is dynamically controlled according to the acquired pressure and the determined correlation, and the system can control the air supply according to real-time requirements of users to minimum the respiratory resistance. The method for controlling the pressure in a mask provides an individualized and real-time ventilation solution, which allows for an adjustment according to specific respiratory requirements of users to effectively deal with the respiratory resistance.

BRIEF DESCRIPTION OF DRAWINGS

To better clarify the technical solutions in the embodiments of the invention or the prior art, drawings used for describing the embodiments of the invention or the prior art are briefly introduced below. Obviously, the following drawings only illustrate some embodiments of the invention, and those ordinarily skilled in the art can obtain other drawings according to the following ones without creative labor.

DETAILED DESCRIPTION OF THE EMBODIMENTS

The technical solutions in the embodiments of the invention are clearly and completely described below in conjunction with accompanying drawings of these embodiments. Obviously, the embodiments in the following description are merely illustrative ones, and are not all possible ones of the invention.

Unless otherwise defined, all technical and scientific terms used here have the same meanings as commonly understood by those skilled in the art. The terms used here are merely for the purpose of describing specific embodiments and are not intended to limit the invention. The term "and/or" used here indicates the inclusion of any or all combinations of one or more related items listed.

Embodiment 1

Figure 1:
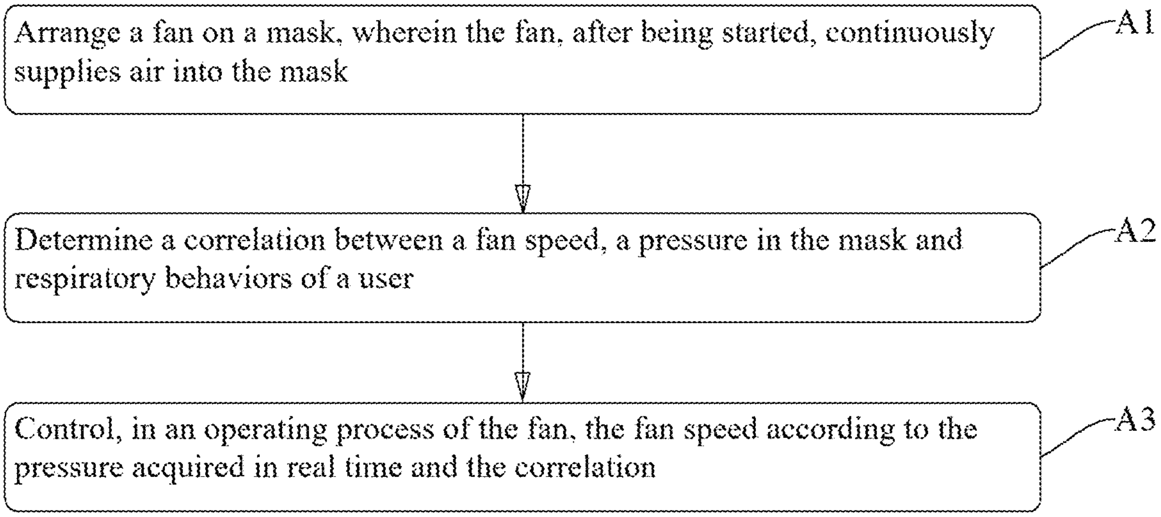
FIG. 1 is a flow diagram of a method for controlling the pressure in a mask.

A method for controlling the pressure in a mask, as shown in FIG. 1, comprises the following steps:

A1: arranging a fan on a mask, wherein the fan, after being started, continuously supplies air into the mask;

A2: determining a correlation between a fan speed, a pressure in the mask and respiratory behaviors of a user; and A3: controlling, in an operating process of the fan, the fan speed according to the pressure acquired in real time and the correlation.

In the invention, the fan is arranged on the mask to draw air into the mask from the outside to reduce the respiratory resistance produced by a filter cartridge; the fan, after being started, continuously supplies air into the mask to ensure that air flows in the mask in the respiration process of users, so as to maintain ventilation. In the actual respiration process, the fan speed is dynamically controlled according to the acquired pressure and the determined correlation, and the system can control the air supply according to actual requirements of users to minimize the respiratory resistance. The method provides an individualized and real-time ventilation solution, which allows for an adjustment according to specific respiratory requirements of users to effectively deal with the respiratory resistance.

In the implementation process, in a case where the correlation needs to be determined depending on the actual operating process of the fan after installation, for example, depending on acquired actual operating data, the sequence of A1 and A2 cannot be changed. In a case where the correlation can be determined independent of the actual operating process, for example, the correlation can be directly output by means a set algorithm after related parameters of the fan and the mask are input, the sequence of A1 and A2 can be changed, or A1 and A2 can be performed separately.

Figure 2:
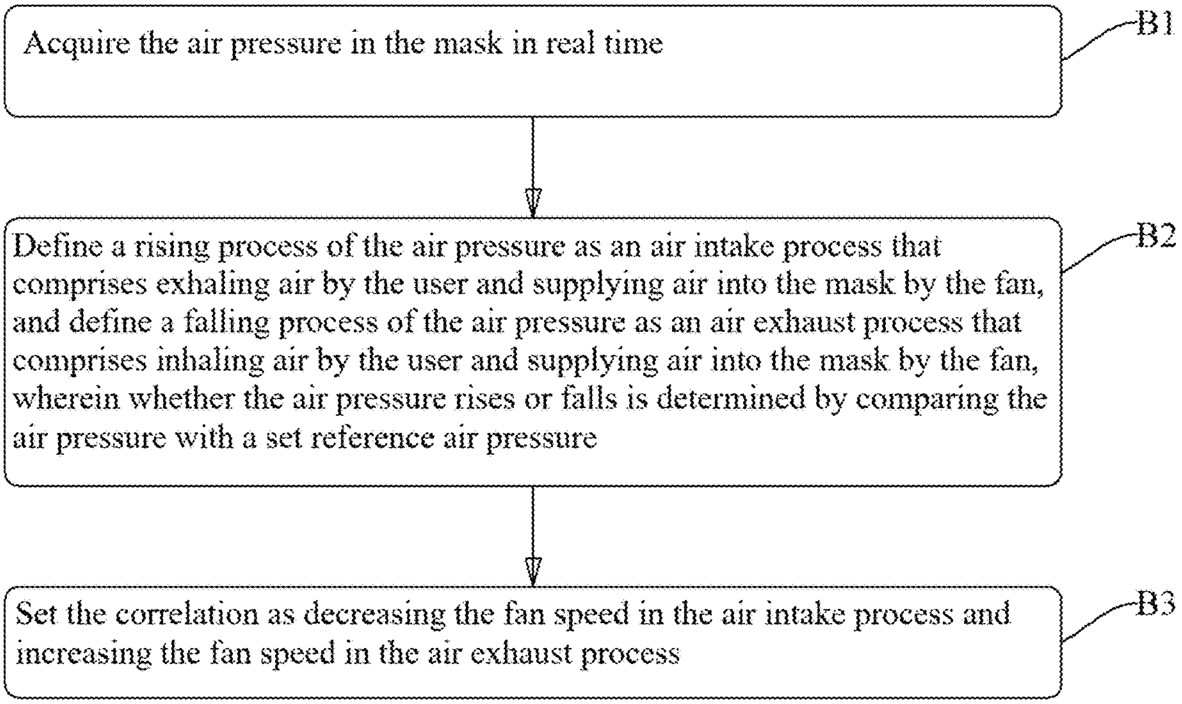
FIG. 2 is a flow diagram for determining a correlation between a fan speed, a pressure in a mask and respiratory behaviors of a user.

Preferably, as shown in FIG. 2, the step of determining a correlation between a fan speed, a pressure in the mask and respiratory behaviors of a user comprises:

- B1: acquiring the air pressure in the mask in real time, wherein in this step, the air pressure in the mask may be acquired in real time by means of a sensor or other devices, and the sensor may be arranged inside the mask or in a channel connecting the inside and outside of the mask to sense the change of an air flow;
- B2: defining a rising process of the air pressure as an air intake process that comprises exhaling air by the user and supplying air into the mask by the fan, and defining a falling process of the air pressure as an air exhaust process that comprises inhaling air by the user and supplying air into the mask by the fan, wherein whether the air pressure rises or falls is determined by comparing the air pressure with a set reference air pressure; and
- B3: setting the correlation as decreasing the fan speed in the air intake process and increasing the fan speed in the air exhaust process, wherein according to the correlation set in this step, the operating state of the fan can be adjusted in real time according to a change of the air pressure to satisfy respiration requirements of the user.

By adopting this optimized scheme, a system can control the fan speed more accurately according to the respiratory pattern of the user to provide more natural and comfortable respiration experience, and can more effectively reduce the respiratory resistance to allow users to use a respirator more comfortably.

In this preferred scheme, by setting the reference air pressure, the system can more flexibly satisfy the requirements of different users. Because different users may have different normal respiratory patterns, the reference air pressure is set to make the system more individualized and adapt to different physiological differences. By setting the reference air pressure, the system can adapt to changes of the respiratory requirements of users in different working environments and on different activity levels, for example, when the respiratory pattern of a user during exercise may be different from the respiratory pattern of the user in a static state, and in this case, the reference air pressure can be set to allow the system to better adapt to these changes.

Preferably, the reference air pressure is input to a PID controller, and with the reference air pressure as a set point, the PID controller controls the fan speed according to a deviation of a currently acquired air pressure from the set point to reduce the deviation.

Figure 3:
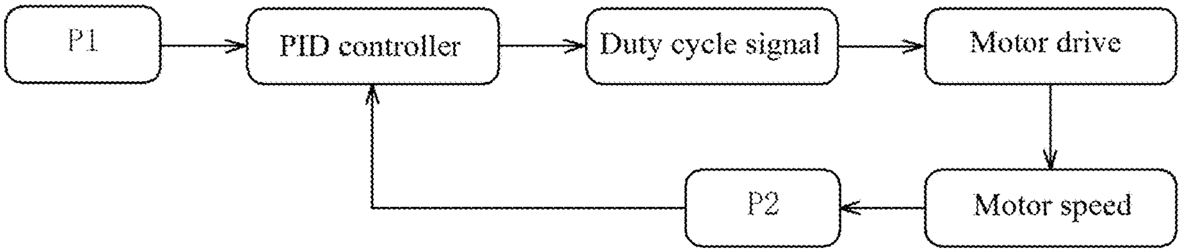
FIG. 3 is a flow diagram of PID control.

In the implementation process, as shown in FIG. 3, the set reference air pressure is P1 and the acquired air pressure is P2, in this preferred scheme, P1 and P2 are input to the PID controller, the PID controller outputs a control signal, which is generally a duty cycle signal, to control a motor drive of the fan so as to regulate the motor speed to control the pressure in the mask.

As a specific implementation, a traditional control model of the PID controller is:

$$u(t) = K_p \cdot e(t) + K_i \cdot \int_0^t e(t)dt + K_d \cdot \frac{de(t)}{dt}$$

where, u(t) is a fan speed output by the PID controller;

e(t) is a current deviation, that is, an error between the set point and the currently acquired air pressure;

$K_p$ is a gain parameter of a proportional term;

$K_i$ is a gain parameter of an integral term;

$K_d$ is a gain parameter of a derivative term;

the three gain parameters are respectively used for adjusting responses of a system to the deviation, the integral term and the change rate;

$$\int_0^t e(t)dt$$

is an integral of e(t) with time, which concerns a long-term accumulative error of the system;

$$\frac{de(t)}{dt}$$

is a derivative of e(t) with time.

Figure 4:
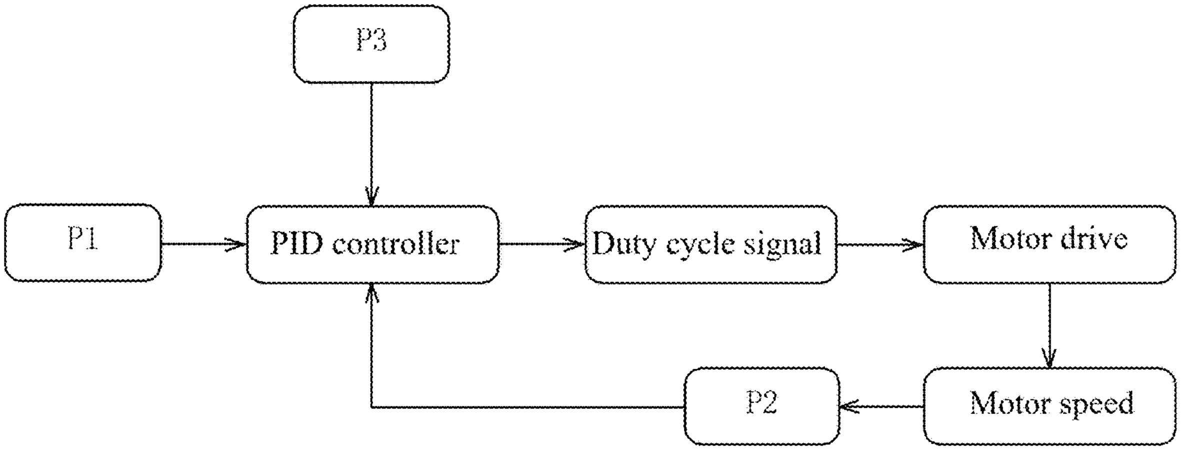
FIG. 4 is a flow diagram of optimized PID control.

In the implementation process, the initial resistance a filter cartridge adopted by a respirator is certain, and the initial resistance of the filter cartridge is set as P3, as shown in FIG. 4 and is input to the PID controller to be taken into account by the system when the fan speed is controlled.

In the specific implementation process, the user of the respirator is often accompanied by a dynamic motion, which surely has a significant influence on the respiratory behaviors. Fully concerning such an influence, a preferred control model of the PID controller is:

$$u(t) = K_p \cdot e(t) + K_i \cdot \int_0^t e(t)dt + K_d \cdot \frac{de(t)}{dt} + K_f \cdot f(t)$$

where, u(t) is a fan speed output by the PID controller;

e(t) is an error between the set point and the currently acquired air pressure;

$K_p$ is a gain parameter of a proportional term;

$K_i$ is a gain parameter of an integral term;

$K_d$ is a gain parameter of a derivative term;

$$\int_0^t e(t)dt$$

is an integral of e(t) with time;

$$\frac{de(t)}{dt}$$

is a derivative of e(t) with time;

$K_f$ is a dynamic gain parameter of the user;

$f(t)$ is a fan speed correction function, to which motion data of the user and air pressure data in the mask are input, and from which a corrected fan speed is output.

In this preferred scheme, when $K_f$ and $f(t)$ are input to the PID controller, the mechanism of dynamic gain is taken into account, wherein $f(t)$ is a dynamic factor related to the user, and the dynamic factor may affect the change of the air pressure in the respirator.

$K_f$, as an adjustment factor, indicates the intensity of the added dynamic gain, and by adjusting the value of $K_f$, the sensitivity of the system to the dynamic factor can be controlled, and the sensitivity and stability of the system need to be balanced when the value of $K_f$ is selected. Specifically, in actual use, the value of $K_f$ should be adjusted according to user feedback and system performance. Specifically, a small value of $K_f$ will make the system not sensitive enough to the change of the dynamic factor, leading to slow response of the system, but the stability is good, and the system is unlikely to generate oscillations or instable behaviors. A medium value of $K_f$ allows for a moderate sensitivity to the change of the dynamic factor, can balance the performance of the system in most cases, and can also well balance the sensitivity and stability of the system, thus being suitable for general usage scenarios. A large value of $K_f$ will lead to an excessive sensitivity of the system to the change of the dynamic factor and make the system too aggressive, leading to oscillations or instable behaviors, but the system shows good performance in quick adaption to user changes is needed, and the users should pay attention to the instability of the system.

In actual use, an optimal value of $K_f$ may be determined by system simulation, experiments and user feedback to ensure that the sensitivity and stability of the system can be balanced in the control process in all cases to provide comfortable and reliable respiration support for users.

Figure 5:
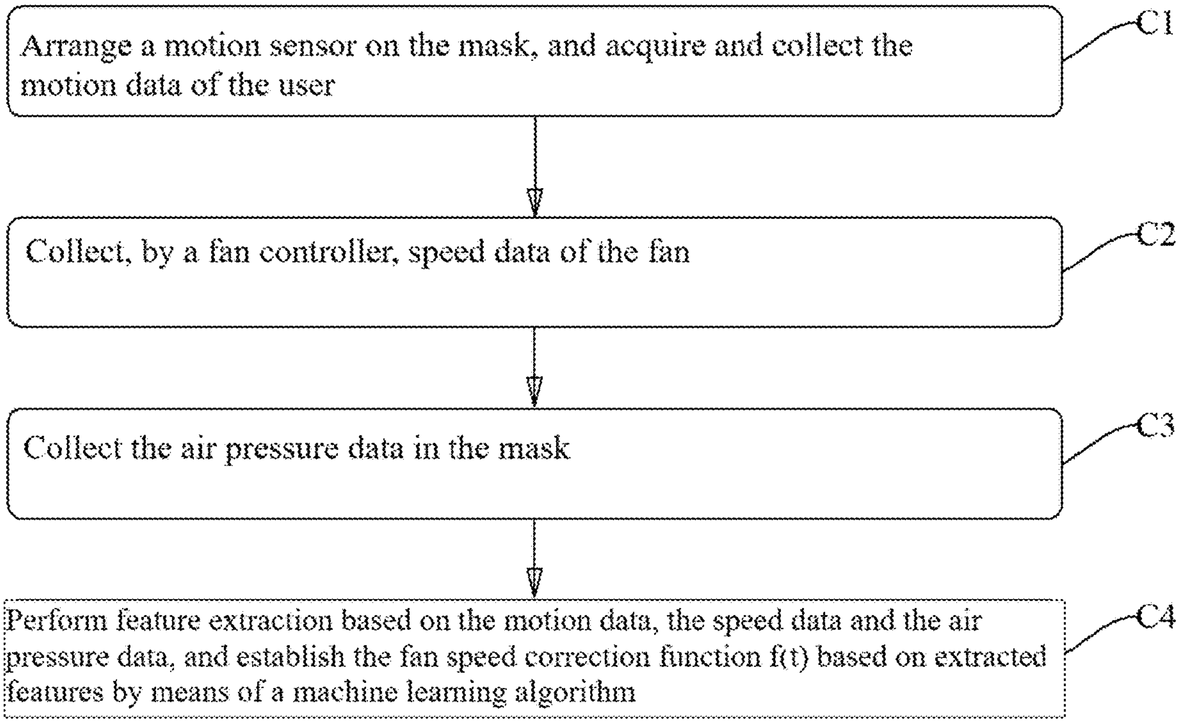
FIG. 5 is a flow diagram of a method for determining a fan speed correction function $f(t)$.

Preferably, as show in FIG. 5, a method for the fan speed correction function $f(t)$ comprises the following steps:

C1: arranging a motion sensor on the mask, and acquiring and collecting the motion data of the user, wherein in this step, the selection of a motion sensor suitable for the mask is of great importance, and the motion sensor may be an accelerometer, a gyroscope or even a visual sensor, and is used for acquiring the motion data of the user in real time;

C2: collecting, by a fan controller, speed data of the fan, wherein to ensure that fan speed data can be acquired frequently enough to better capture a dynamic change of the system, high-frequency data acquisition may be performed according to the response speed of the system;

C3: collecting the air pressure data in the mask, wherein the air pressure data are data acquired in Step B1; and

C4: performing feature extraction based on the motion data, the speed data and the air pressure data, and establishing the fan speed correction function $f(t)$ based on extracted features by means of a machine learning algorithm, wherein features selected in the feature extraction stage should be able to effectively reflect the relationship between the motion data, the fan speed and the air pressure, and specifically may be temporal sequence features, frequency domain features and possible interaction features; in the data acquisition process, the motion data, the speed data and the air pressure data should be temporally synchronous, which is very important for the establishment of an accurate model, and if the data are not acquired synchronously, interpolation or other synchronization methods may be adopted.

A traditional PID control model is linear and cannot process some nonlinear system responses. In this preferred scheme, the fan speed correction function is introduced to ensure that the system can well adapt to nonlinear relations, thus improving the capacity to model complex relations of the system. In addition, the traditional PID control model generally depends on preset parameters, while the dynamic gain parameter introduced here can be adjusted in operation according to the actual condition, such that the real-time performance and stability are better balanced, particularly in a real-time system such as a respirator.

In the implementation process, the dynamic gain parameter $K_f$ allows for an adjustment of the sensitivity of the system according to real-time motion data, air pressure and other factors, thus improving the adaptability of the system to different operation conditions and ensuring that stable and effective respiration support can be provided in different usage scenarios. The machine learning model can better process uncertain and nonstructured data to deal with various uncertainties that possibly occur in a respirator system, such as sudden changes of the motion pattern of the user or uncertainties of the external environment.

Figure 6:
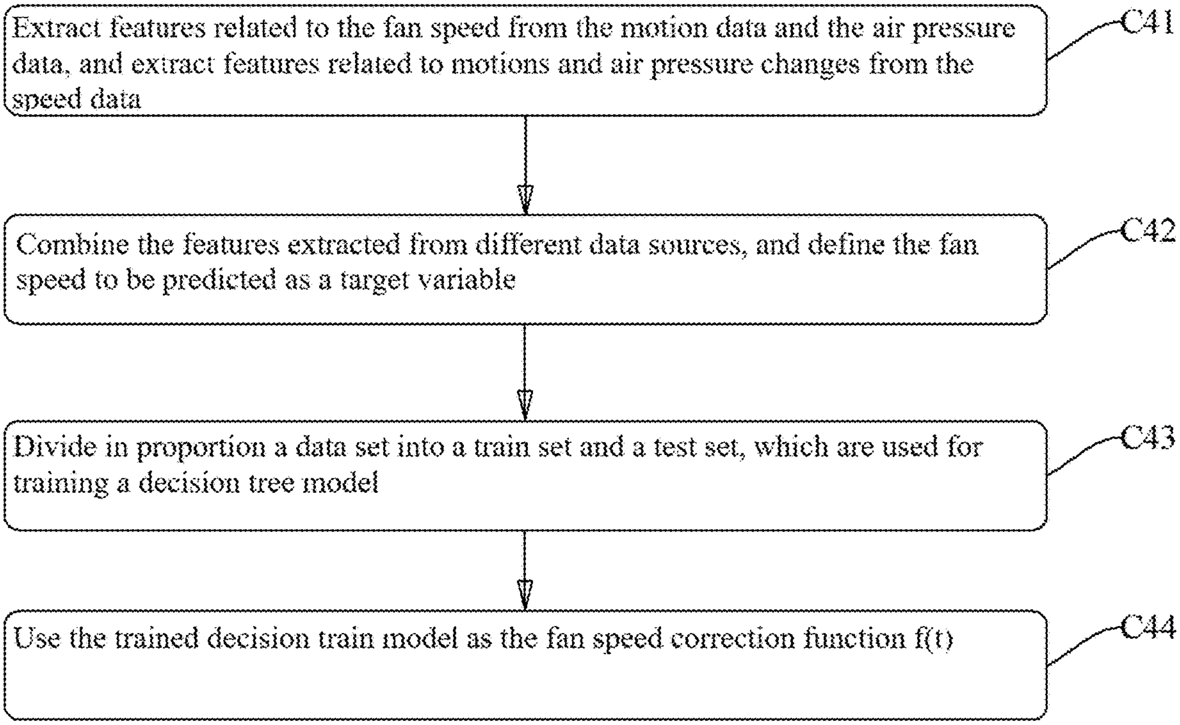
FIG. 6 is a flow diagram of performing feature extraction based on motion data, speed data and air pressure data and establishing a fan speed correction function $f(t)$ based on extracted features by means of a machine learning algorithm.

Preferably, the step of performing feature extraction based on the motion data, the speed data and the air pressure data, and establishing the fan speed correction function $f(t)$ based on extracted features by means of a machine learning algorithm, as shown in FIG. 6, comprises:

C41: extracting features related to the fan speed from the motion data and the air pressure data, and extracting features related to motion and air pressure changes from the speed data;

wherein, features extracted from the motion data comprise a motion amplitude, a motion frequency, a motion direction, a motion change rate, an average motion velocity or a motion acceleration, and dynamic motion features in temporal sequence analysis, and the like; features extracted from the air pressure data comprise a trend and change rate of the air pressure, a peak value and valley value of the air pressure, statistical features of the air pressure on different time scales, and the like; features extracted from the speed data comprise an average speed, a change rate of speed, a spectral analysis of the speed data such as Fourier transform, a trend and periodic features of speed, and the like;

C42: combining the features extracted from different data sources, and defining the fan speed to be predicted as a target variable, wherein specifically, the features extracted from the motion data, the air pressure data and the speed data are combined into a feature vector;

C43: dividing in proportion a data set into a train set and a test set, which are used for training a decision tree model; and

C44: using the trained decision train model as the fan speed correction function $f(t)$.

In the training process, the train set is used for model training, the test set is used for evaluating model performance, and hyper-parameters of a decision tree can be adjusted to improve the model performance by cross validation or the like; the test set is used for evaluating the model to guarantee the generalization performance of the model; the decision tree model, after being trained and evaluated, is integrated into the system, the real-time performance of the model is tested to ensure that the model satisfies the real-time requirement in actual use, and the performance of the model is monitored regularly.

In this preferred scheme, the reason why the decision tree model is used is that it has a clear structure and is easy to understand and explain, which, in the respirator system, is very important for professionals and terminal users who have a clear understanding of the operating principle of the model; the decision tree can effectively capture and process nonlinear relations, has a good adaptability to the interaction between features, and can well process variable and complex relations between motion data, speed data and air pressure data in the respirator system, and the decision tree can output the importance of features to help determine critical features for predicting the fan speed, which is beneficial to feature selection optimization and model explanation; and the decision tree can process hybrid data, including numeric data and categorical data, which is beneficial for processing different types of data that may be involved in the fan speed correction function.

Figure 7:
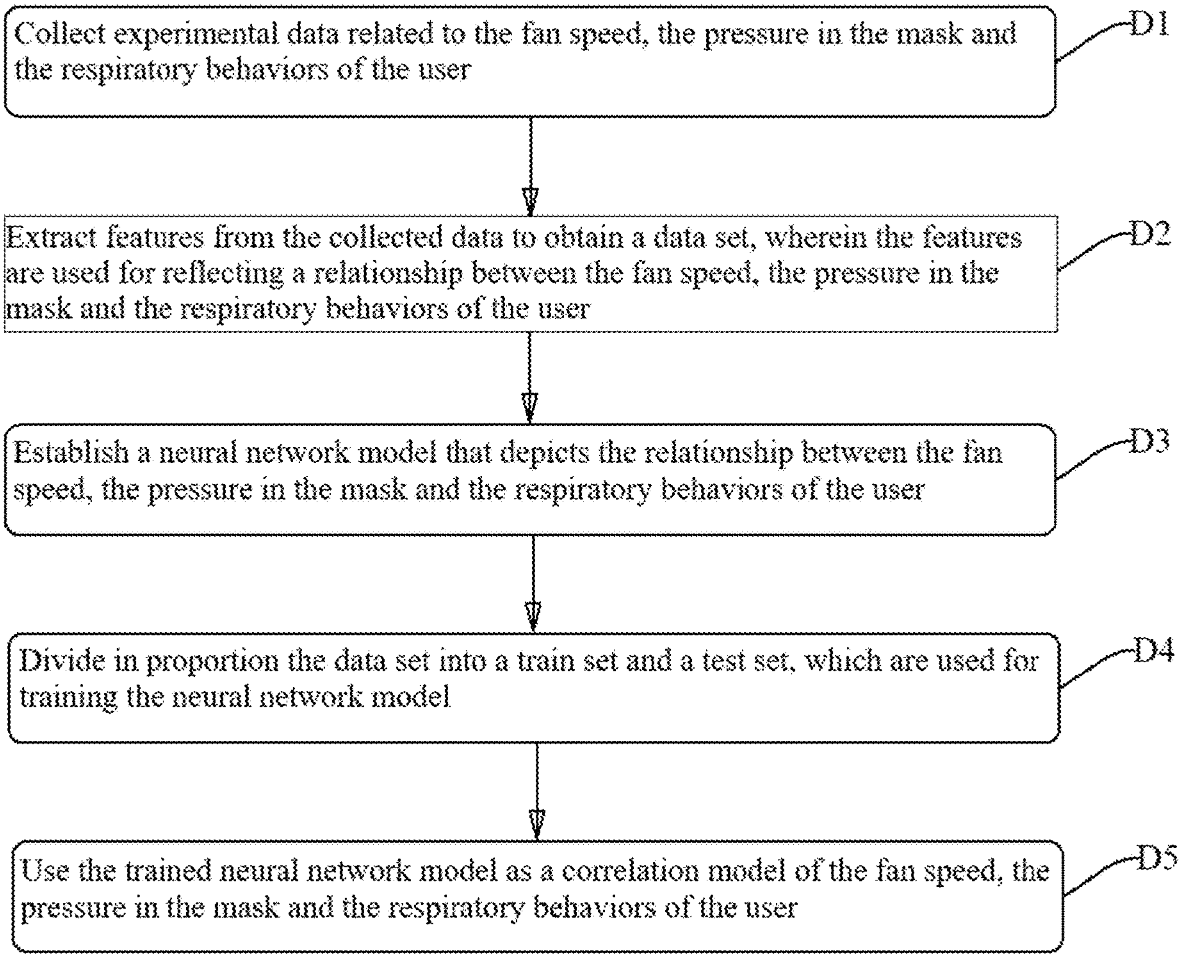
FIG. 7 is a flow diagram for determining a correlation between a fan speed, a pressure in a mask and respiratory behaviors of a user according to another embodiment.

As another optimized scheme, as shown in FIG. 7, the step of determining a correlation between a fan speed, a pressure in the mask and respiratory behaviors of a user comprises:

- D1: collecting experimental data related to the fan speed, the pressure in the mask and the respiratory behaviors of the user, wherein the experimental data may specifically comprise the pressure in the mask measured under different fan speeds, and data related to the respiratory behaviors of the user, such as the respiration frequency and the tidal volume;
- D2: extracting features from the collected data to obtain a data set, wherein the features are used for reflecting a relationship between the fan speed, the pressure in the mask and the respiratory behaviors of the user;
- D3: establishing a neural network model that depicts the relationship between the fan speed, the pressure in the mask and the respiratory behaviors of the user;
- D4: dividing in proportion the data set into a train set and a test set, which are used for training the neural network model; and
- D5: using the trained neural network model as a correlation model of the fan speed, the pressure in the mask and the respiratory behaviors of the user.

Wherein, preferably, the neural network model comprises:

- an input layer, corresponding to features of the fan speed, the pressure in the mask and the respiratory behaviors of the user by means of three nodes respectively;
- hidden layers, at least comprising an LSTM layer used for capturing temporal information in sequential data;
- an output layer, used for outputting a predicted fan speed; and
- activation functions, added behind each hidden layer and the output layer to introduce nonlinearity;
- wherein, when the trained neural network model is used, the currently acquired pressure in the mask is input to the neural network model, and the neural network model outputs the predicted fan speed, which is used for controlling the fan speed.

In an application scenario of a respirator, seasonal changes may lead to changes of respiratory behaviors, for example, the change in temperature and humidity will affect the comfort and resistance of the respiratory tract, and the LSTM layer can learn and capture such seasonal changes to allow the model to better adapt to dynamic changes of the respiratory behaviors in different times. The respiratory resistance in the mask may be affected by multiple factors which have a long-term correlation in time, and the LSTM layer can capture such a correlation to allow the model to better understand and predict long-term dynamic changes of the respiratory resistance in the mask.

After the neural network model is trained, the currently acquired pressure in the mask can be directly input to the neural network model to predict the fan speed; in the model training process, the correlation model of the fan speed, the pressure in the mask and the respiratory behaviors of the user is established, and the model is trained to learn the relationship between the fan speed, the pressure in the mask and the respiratory behaviors of the user; and when the model is used, to reduce the cost of the respirator, only the pressure in the mask is acquired in the implementation process, and because the model has learnt the correlation between the pressure in the mask and the fan speed in the training process and the LSTM layer allows the model to memorize previous information, the model can better adapt to the current input and predict the fan speed according to the correlation learned in the training process.

Embodiment 2

A system for controlling the pressure in a mask uses the method for controlling the pressure in a mask in Embodiment 1 and comprises:

- a fan, arranged on a mask and after being started, used for continuously supplying air into the mask;
- a correlation analysis module, used for determining a correlation between a fan speed, a pressure in the mask and respiratory behaviors of a user; and
- a control module, used for controlling, in an operating process of the fan, the fan speed according to the pressure acquired in real time and the correlation.

Embodiment 3

A respirator comprises a mask and the system for controlling the pressure in a mask in Embodiment 2, wherein the pressure in the mask is controlled by the system for controlling the pressure in a mask.

The technical effects fulfilled by Embodiments 2 and 3 are the same as those fulfilled by Embodiment 1 and will not be repeated here.

The basic principle, main features and advantages of the invention are illustrated and described above. Those skilled in the art should understand that the invention is not limited to the above embodiments, the above embodiments and descriptions are merely used to explain the principle of the invention, various modifications and improvements can be made without departing from the spirit and scope of the invention, and all these modifications and improvement should also fall within the protection scope of the invention. The protection scope of the invention should be defined by the appended claims and their equivalents.

What is claimed is:

1. A method for controlling an air pressure in a mask, comprising:

arranging a fan on the mask, wherein the fan, after being started, continuously supplies air into the mask;

determining a correlation between a fan speed, the air pressure in the mask and respiratory behaviors of a user; and controlling, in an operating process of the fan, the fan speed according to the air pressure in the mask acquired in real time and the correlation;

wherein the determining the correlation between the fan speed, the air pressure in the mask and respiratory behaviors of the user comprises:

acquiring the air pressure in the mask in real time; and defining a rising process of the air pressure as an air intake process that comprises exhaling air by the user and supplying air into the mask by the fan, and defining a falling process of the air pressure as an air exhaust process that comprises inhaling air by the user and supplying air into the mask by the fan, wherein whether the air pressure rises or falls is determined by comparing the air pressure with a set reference air pressure; and setting the correlation such that it decreases the fan speed in the air intake process and increases the fan speed in the air exhaust process;

inputting the set reference air pressure into a PID controller, whereby, with the set reference air pressure as a set point, the PID controller controls the fan speed according to a deviation of a currently acquired air pressure from the set point to reduce the deviation;

wherein a control model of the PID controller is:

$$u(t) = K_p \cdot e(t) + K_i \cdot \int_0^t e(t)dt + K_d \cdot \frac{de(t)}{dt} + K_f \cdot f(t);$$

where, u(t) is a fan speed output by the PID controller;

e(t) is an error between the set point and the currently acquired air pressure;

$K_p$ is a gain parameter of a proportional term;

$K_i$ is a gain parameter of an integral term;

$K_d$ is a gain parameter of a derivative term;

$$\int_0^t e(t)dt$$

is an integral of e(t) with time;

$$\frac{de(t)}{dt}$$

is a derivative of e(t) with time;

$K_f$ is a dynamic gain parameter of the user;

ƒ(t) is a fan speed correction function, to which motion data of the user and air pressure data in the mask are input, and from which a corrected fan speed is output;

wherein determining the fan speed correction function ƒ(t) comprises:

arranging a motion sensor on the mask, and acquiring and collecting the motion data of the user;

collecting, by a fan controller, speed data of the fan;

collecting the air pressure data in the mask; and performing feature extraction based on the motion data, the speed data and the air pressure data, and establishing the fan speed correction function ƒ(t) based on extracted features by a machine learning algorithm;

wherein the performing feature extraction based on the motion data, the speed data and the air pressure data, and establishing the fan speed correction function ƒ(t) based on extracted features by the machine learning algorithm comprises:

extracting features related to the fan speed from the motion data and the air pressure data, and extracting features related to motions and air pressure changes from the speed data, wherein features extracted from the motion data comprise a motion amplitude, a motion frequency, a motion direction, a motion change rate, an average motion velocity or a motion acceleration, and dynamic motion features in temporal sequence analysis, wherein features extracted from the air pressure data comprise a trend and change rate of the air pressure, a peak value and valley value of the air pressure, and statistical features of the air pressure on different time scales, and wherein features extracted from the speed data comprise an average speed, a change rate of speed, a spectral analysis of the speed data, and a trend and periodic features of speed;

combining the features extracted from the motion data, the air pressure data and the speed data, and defining the fan speed to be predicted as a target variable;

dividing in proportion a first data set into a first train set and a first test set, which are used for training a decision tree model;

wherein, as a training process, the first train set is used for model training, the first test set is used for evaluating model performance, and hyperparameters of a decision tree are adjusted to perform cross validation; and using the trained decision tree model as the fan speed correction function ƒ(t);

wherein the determining the correlation between the fan speed, the air pressure in the mask and respiratory behaviors of the user further comprises:

collecting experimental data related to the fan speed, the air pressure in the mask and the respiratory behaviors of the user;

extracting features from the experimental collected data to obtain a second data set, wherein the features extracted from the experimental collected data are used for reflecting a relationship between the fan speed, the air pressure in the mask and the respiratory behaviors of the user;

establishing a neural network model that depicts the relationship between the fan speed, the air pressure in the mask and the respiratory behaviors of the user;

dividing in proportion the second data set into a second train set and a second test set, which are used for training the neural network model; and using the trained neural network model as a correlation model of the fan speed, the air pressure in the mask and the respiratory behaviors of the user;

wherein the neural network model comprises hidden layers, at least comprising a long short-term memory (LSTM) used for capturing temporal information in sequential data.

2. The method for controlling the air pressure in the mask according to claim 1, wherein the neural network model further comprises:

an input layer, comprising three nodes corresponding to features of the fan speed, the air pressure in the mask and the respiratory behaviors of the user respectively;

an output layer, used for outputting a predicted fan speed; and activation functions, added behind each said hidden layer and the output layer to introduce nonlinearity;

wherein using the trained neural network model includes wherein the currently acquired air pressure in the mask is input to the neural network model, and the neural network model outputs the predicted fan speed, which is used for controlling the fan speed.

* * * * *